US012314476B2

(12) United States Patent
Asgekar et al.

(10) Patent No.: US 12,314,476 B2
(45) Date of Patent: May 27, 2025

(54) MULTI-USER COLLABORATIVE INTERFACES FOR STREAMING VIDEO

(71) Applicant: Pencil Learning Technologies, Inc., Palo Alto, CA (US)

(72) Inventors: Amogh Asgekar, Palo Alto, CA (US); Ayush Agarwal, San Francisco, CA (US)

(73) Assignee: Pencil Learning Technologies, Inc., Palo Alto, CA (US)

( * ) Notice: Subject to any disclaimer, the term of this patent is extended or adjusted under 35 U.S.C. 154(b) by 24 days.

(21) Appl. No.: 17/984,157

(22) Filed: Nov. 9, 2022

(65) Prior Publication Data

US 2023/0141680 A1 May 11, 2023

Related U.S. Application Data

(60) Provisional application No. 63/278,073, filed on Nov. 10, 2021.

(51) Int. Cl.
| | |
|---|---|
| *G06F 3/01* | (2006.01) |
| *G06F 3/14* | (2006.01) |
| *G06T 3/00* | (2024.01) |
| *G06V 10/40* | (2022.01) |
| *G06V 40/20* | (2022.01) |

(52) U.S. Cl.
CPC .............. *G06F 3/017* (2013.01); *G06F 3/011* (2013.01); *G06F 3/1454* (2013.01); *G06T 3/00* (2013.01); *G06V 10/40* (2022.01); *G06V 40/28* (2022.01)

(58) Field of Classification Search
CPC ........ G06F 3/017; G06F 3/011; G06F 3/1454; G06F 2203/0381; G06T 3/00; G06V 10/40; G06V 40/28; G06V 10/422; G06V 10/762; H04L 65/4015; H04L 65/765; H04L 65/403; H04N 7/147; G09G 2340/12; G09G 2354/00
See application file for complete search history.

(56) References Cited

U.S. PATENT DOCUMENTS

| | | | |
|---|---|---|---|
| 6,809,843 B1 * | 10/2004 | Youngers ............. | H04N 1/3247 382/233 |
| 2014/0267078 A1 * | 9/2014 | Kukulski ............ | G06F 3/04162 345/173 |

(Continued)

*Primary Examiner* — Grant Sitta
(74) *Attorney, Agent, or Firm* — Pierson Ferdinand LLP; Daniel Rose

(57) ABSTRACT

The present disclosure provides systems and methods of providing multi-user collaborative interfaces. A computing system may receive a video stream. The video stream may have an overlay interface defined along a first plane. The computing system may identify, in at least one frame, a region defined on a second plane on which a user's hand is oriented. The computing system may determine that a set of features associated with the user's hand within the region corresponds to a draw command. The computing system may identify, from the region, a first coordinate for the draw command based on at least one of the set of features. The computing system may translate the first coordinate to a second coordinate defined on the first plane to which to apply the draw command. The computing system may render a visual element at the second coordinate in the overlay interface.

14 Claims, 11 Drawing Sheets

(56) References Cited

U.S. PATENT DOCUMENTS

| | | | |
|---|---|---|---|
| 2015/0062004 A1* | 3/2015 | Rafii | G06F 3/011 |
| | | | 345/156 |
| 2016/0104313 A1* | 4/2016 | Du | H04N 13/373 |
| | | | 348/51 |
| 2019/0260964 A1* | 8/2019 | Nagpal | G06F 3/048 |
| 2020/0389691 A1* | 12/2020 | Yoshizawa | G09G 3/20 |

* cited by examiner

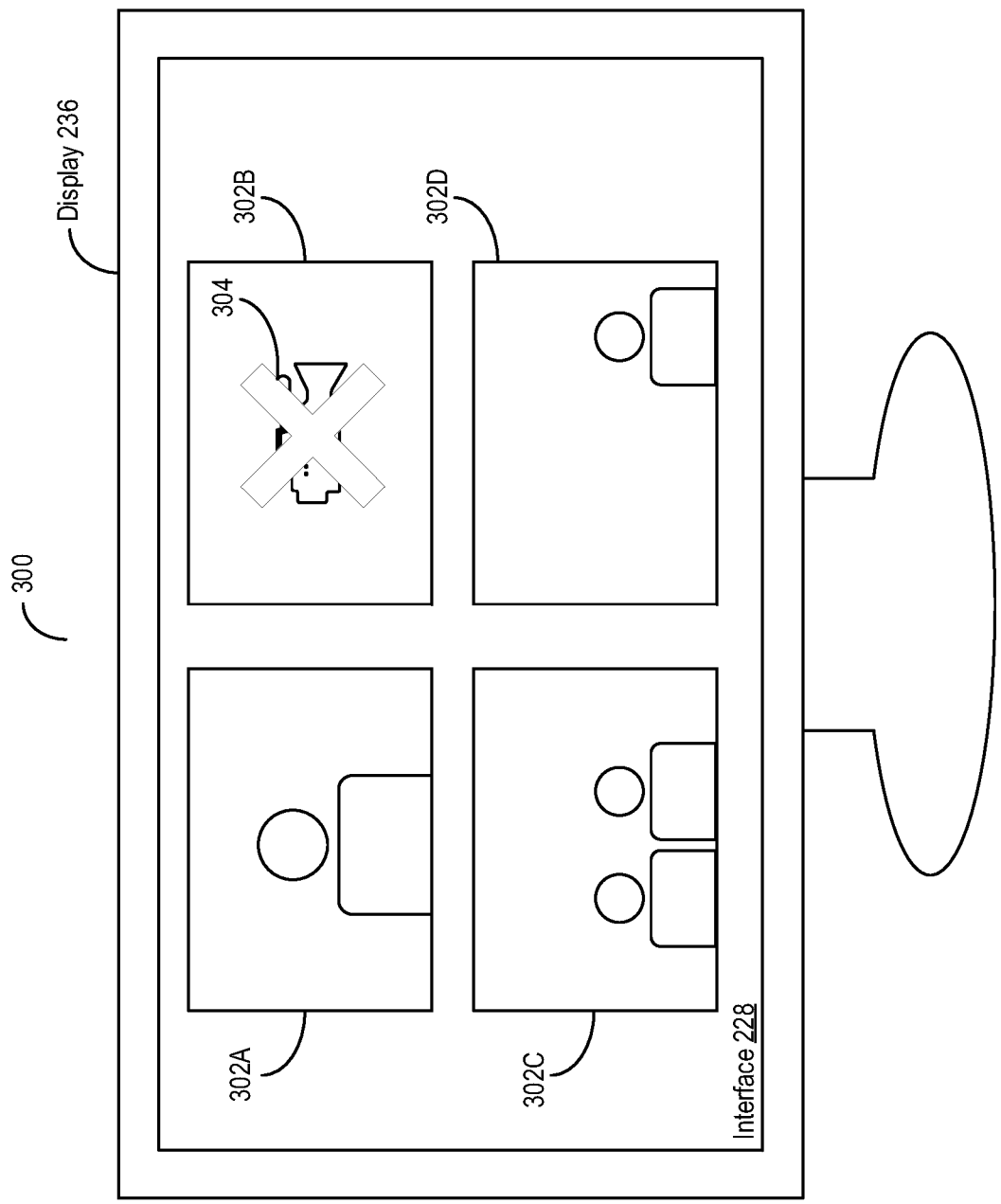

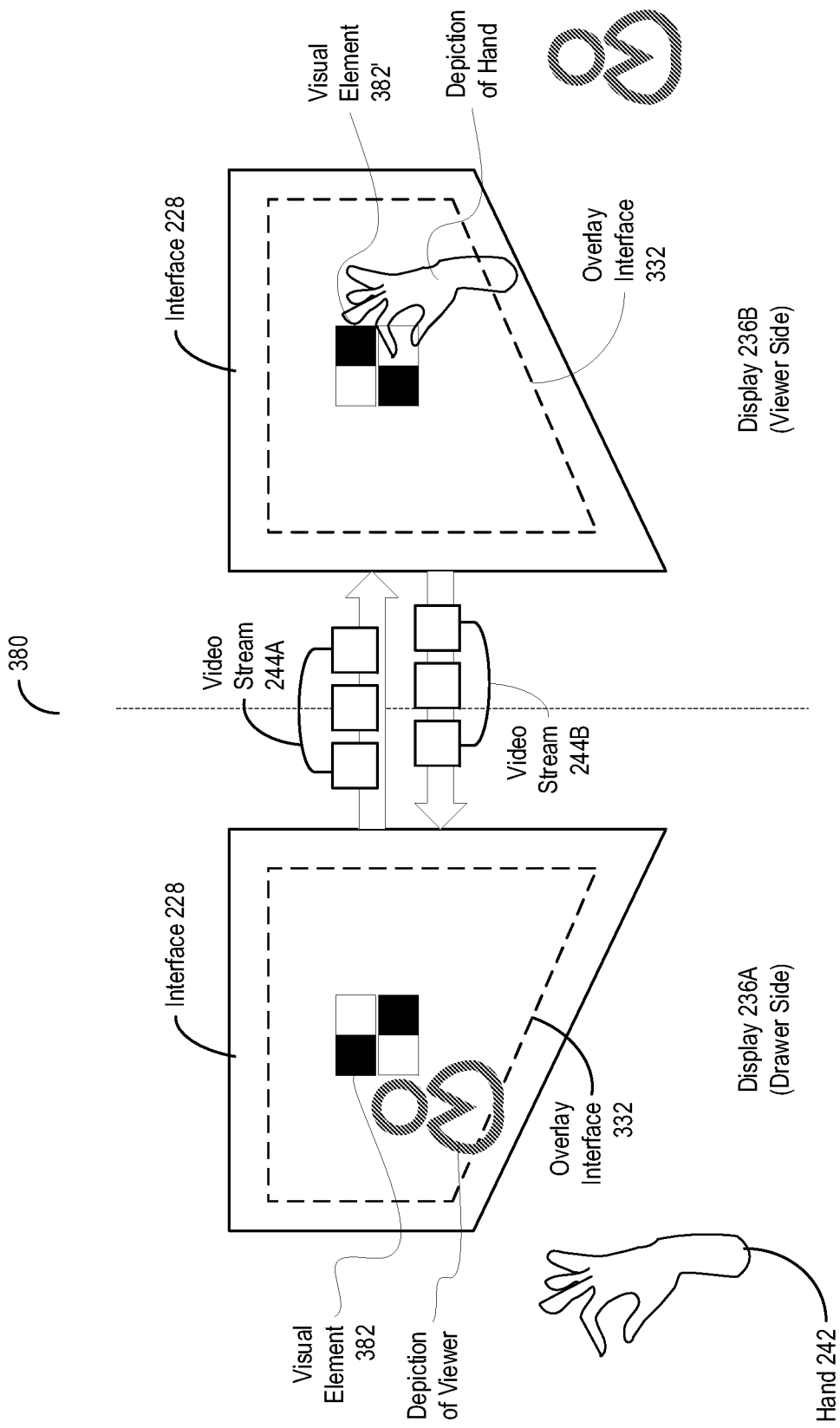

MULTI-USER COLLABORATIVE INTERFACES FOR STREAMING VIDEO

RELATED APPLICATIONS

This application claims the benefit of and priority to U.S. Provisional Patent Application No. 63/278,073, entitled "Multi-user Collaborative Interfaces for Streaming Video," filed Nov. 10, 2021, the entirety of which is incorporated herein by reference.

BACKGROUND

A computing device may use an input/output (I/O) device such as a keyboard, mouse, or touchscreen to receive an input interaction from a user. Upon receipt, the computing device may process the input acquired via the I/O device to generate an output for presentation.

SUMMARY

In a collaborative editing environment, multiple users at computing devices can view and make modifications to a single piece of data (e.g., digital document, spreadsheet, source code) using tactile input/output (I/O) devices, such a keyboard, mouse, or touchscreen. The collaborative editing environment can be asynchronous or synchronous. A synchronous collaborative editor can allow for multiple users to view and edit the same piece of data concurrently in near real-time. For example, a group of users can be granted permission to edit a digital document via a word processing application and to view revisions made by other users. An asynchronous collaborative editor can allow for multiple users to view and edit the same data separately from one another. For instance, each user in the group can open and edit a separate copy of a digital document and push out the revisions to the aggregate document visible to the other users.

Although these collaborative editing environments can allow users to easily modify data using tactile I/O devices in near-real time, these editors can lack the capability of using gesture recognition as input. With the proliferation of video conferencing, the use of tactile I/O devices can be inadequate for collaborative editing. Furthermore, the inability to use gestures as inputs to make edits on a virtual shared space can be frustrating to user experience. This can also force users to open a separate interface or a whole other application to use as a collaborative editor to edit using tactile I/O devices. As a result, the amount of computing resources and network bandwidth consumed to carry out collaborative editing may increase.

To address these and other technical challenges, a computing device or a virtual glass board can be provided to allow users to draw directly on the screen by tracking hand motions and gestures via camera. The glass board application can intelligently recognize when users intend to make a stroke based on visual factors, automatically reorienting the drawing so that the draw appears properly for both the drawer or the viewer. The drawings can be superimposed over whatever is currently on the screen or be confined to drawing a space. Once complete, the drawings can be manipulated similar to any other visual element in a collaborative white board.

The glass board application can process an image to extract finger and hand landmarks. The application can apply a perspective correction transformation from the image frames to account for users that cannot be exactly in front of the camera. If the drawing boundaries have not been initialized, the application can allow one of the users to define the drawing canvas in space by setting coordinates based on their finger location. With the defining of the drawing canvas, the application can run a logistic regression model over the extracted hand landmarks to select between a drawing mode and a gesture mode.

When the drawing mode is selected, the application can identify a top point of the index finger of the user's hand and translate the coordinates from the drawing canvas to the interface surface of the application. The final translated coordinates can represent where a visual element is to be added in accordance with the draw mode. In contrast, when the gesture mode is selected, the application can apply a deep neural network (DNN) with a softmax output over the last feature map to recognize an action performed by the user's hand, such as a closed first, open hand, left thumb, or right thumb, among others. These actions can correspond to various commands, such as grab and move, release and place at new location, undo, and redo respectively. Other actions can be defined by the user.

In either mode, the glass board application can apply a two-dimensional matrix dimension to determine a coordinate of the point to be added or object transformation to be applied. The application can render the visual element onto a frame or an interface overlaid on top of the video feed. Finally, the application can mirror this feed when shown to the current user, but refrain from flipping when transmitting to others. This can be to ensure that both the local user and the remote users see the written text ordered in the correct orientation. With the capability of processing hand gestures to an interface, the virtual glass board application can provide for a collaborative editing environment, thereby improving the overall quality of human-computer interactions (HCI). In addition, by avoiding the user from having to open other applications while using video conferencing, the application can also reduce the consumption of the computing resources and network bandwidth.

At least one other aspect of the present disclosure is directed to systems and methods of providing multi-user collaborative interfaces for streaming video content. A computing system can receive, via a camera, a video stream having a plurality of frames of a user's hand. The video stream can have an overlay interface defined along a first plane. The computing system can identify, in at least one of the plurality of frames, a region defined on a second plane on which the user's hand is oriented. The computing system can determine that a set of features associated with the user's hand within the region defined on the second plane corresponds to a draw command. The computing system can identify, from the region defined on the second plane, a first coordinate for the draw command based on at least one of the set of features. The computing system can translate the first coordinate defined on the second plane to a second coordinate defined on the first plane of the overlay interface to which to apply the draw command. The computing system can render a visual element at the second coordinate in the overlay interface of the video stream.

In some implementations, the computing system can determine that a second set of features associated with the user's hand within the region corresponds to an edit command. In some implementations, the computing system can identify, from the region defined on the second plane, a third coordinate for the edit command based on at least one of the second set of features. In some implementations, the computing system can determine that the third coordinate defined on the second plane corresponds to the visual element at the second coordinate defined on the second coordinate. In some implementations, the computing system can modify, responsive to determining that the third coordinate corresponds to the visual element, the rendering of the visual element in accordance with the edit command.

In some implementations, the computing system can determine that the second set of features corresponds to the edit command by applying a feature extraction model to the region in at least one of the plurality of frames to detect the second set of features. In some implementations, the computing system can determine that the second set of features corresponds to the edit command by identifying the edit command from a plurality of edit commands based on the second set of features. The plurality of edit commands can include a move operation, an undo operation, a redo operation, and a scaling operation.

In some implementations, the computing system can translate a fourth coordinate for the edit command defined on the second plane to a fifth coordinate on the first plane of the overlay interface. In some implementations, the computing system can modify the rendering of the visual element based on the second coordinate and the fifth coordinate in accordance with the edit command.

In some implementations, the computing system can determine, responsive to the region not being defined, a second set of features associated with the user's hand in at least one of the plurality of frames of the video stream. In some implementations, the computing system can identify, based on the second set of features, a plurality of coordinates on the second plane to define the region, the second plane oblique to the first plane.

In some implementations, the computing system can apply a perspective correction to each frame in the plurality of frames in accordance with a position of a user relative to a display for rendering of the video stream. In some implementations, the computing system can apply a mode identification model to the set of features from the region of at least one of the plurality of frames to select the draw command instead of an edit command.

In some implementations, the computing system can apply a matrix transformation to the first coordinate from the second plane to identify the second coordinate in the first plane of the overlay interface. The matrix transform can define a translation from the second plane of the region to the first plane of the overlay interface. In some implementations, the computing system can render, for a user to which the user's hand belongs, a mirror of the visual element in the overlay interface of the video stream. In some implementations, the computing system can provide, to a display of a remote user, each of the plurality of frames of the video stream, without mirroring the visual element.

These and other aspects and implementations are discussed in detail below. The foregoing information and the following detailed description include illustrative examples of various aspects and implementations, and provide an overview or framework for understanding the nature and character of the claimed aspects and implementations.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3A depicts a block diagram of a process of presenting streaming content in the system for providing multi-user collaborative interfaces in accordance with an illustrative embodiment;

FIG. 3E depicts a block diagram of a process of mirroring renderings in the system for providing multi-user collaborative interfaces in accordance with an illustrative embodiment.

DETAILED DESCRIPTION

Below are detailed descriptions of various concepts related to, and implementations of, techniques, approaches, methods, apparatuses, and systems for multi-user collaborative interfaces in streaming video content. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods of providing multi-user collaborative interfaces in streaming video content.

A. Computing and Network Environment

Figure 1A:
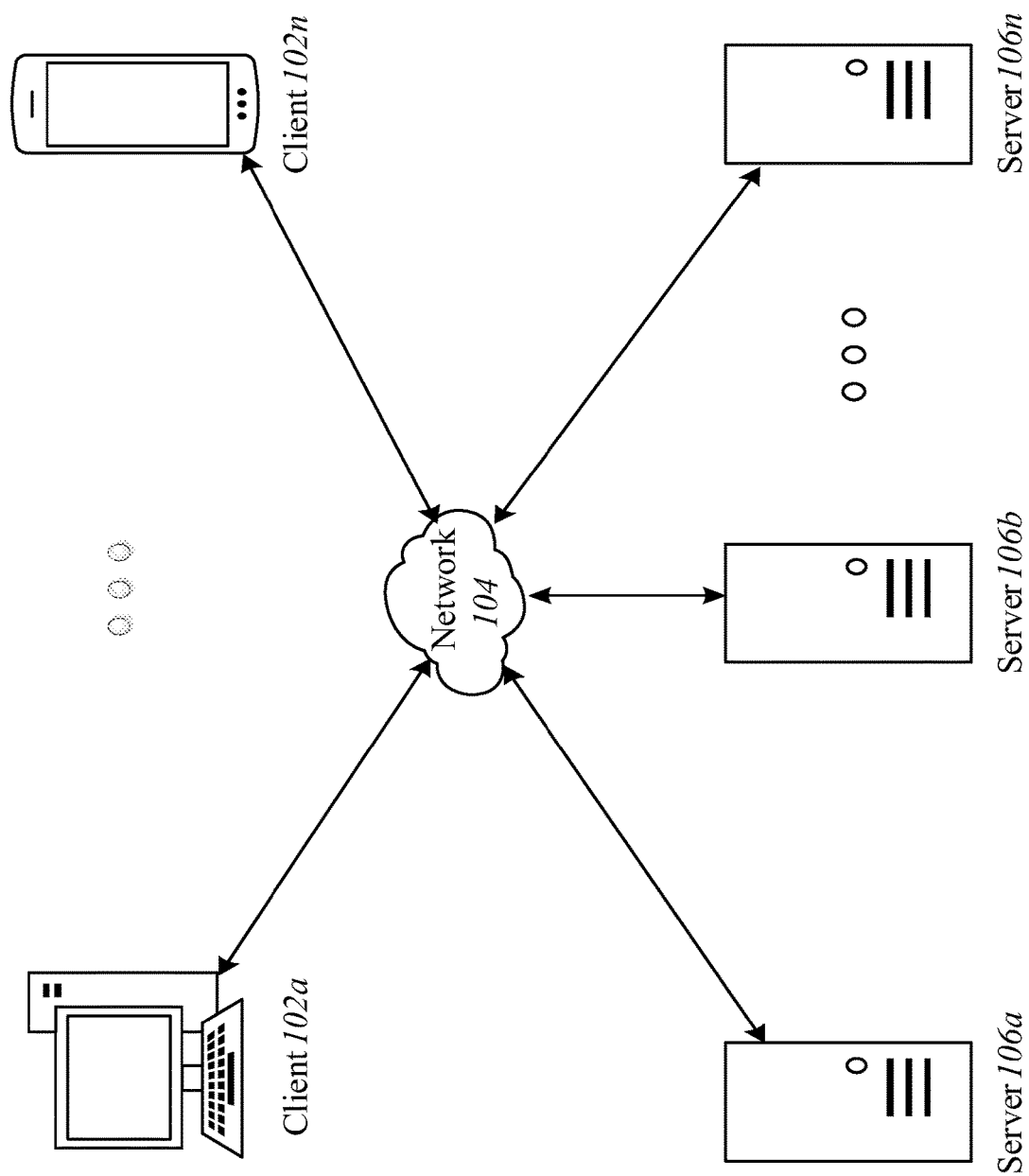
FIG. 1A is a block diagram depicting an embodiment of a network environment comprising a client device in communication with a server device.

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some implementations, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some implementations, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g., FDMA, TDMA, CDMA, or SDMA. In some implementations, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g., Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some implementations, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, In some implementations, with a dynamic store.

Server 106 may be a file server, application server, web server, proxy server, appliance, network appliance, gateway, gateway server, virtualization server, deployment server, SSL VPN server, or firewall. In one embodiment, server 106 may be referred to as a remote machine or a node. In another embodiment, a plurality of nodes 290 may be in the path between any two communicating servers.

Figure 1B:
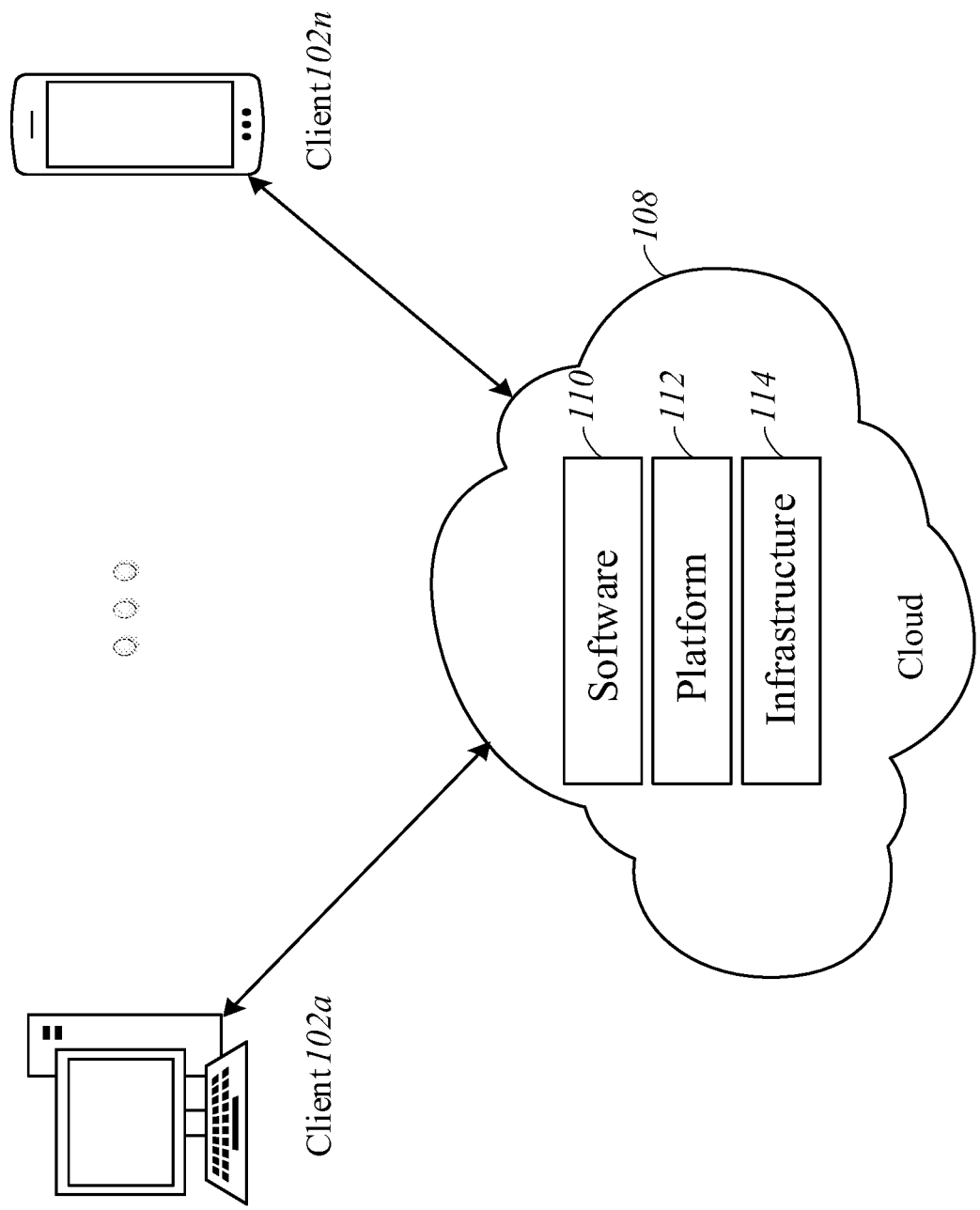
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some implementations, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some implementations, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
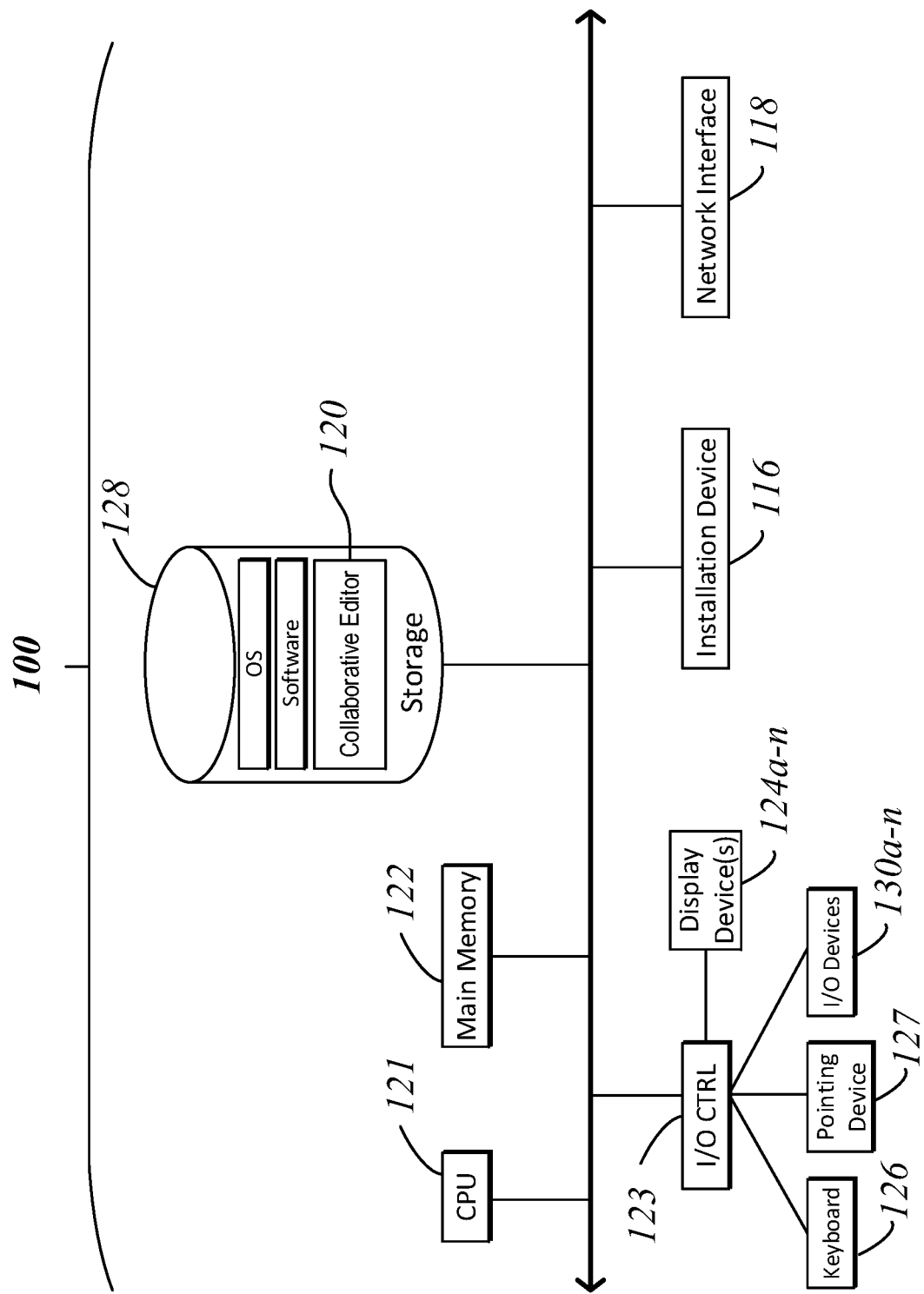
FIGS. 1C and 1D are block diagrams depicting embodiments of computing devices useful in connection with the methods and systems described herein.
Figure 1D:
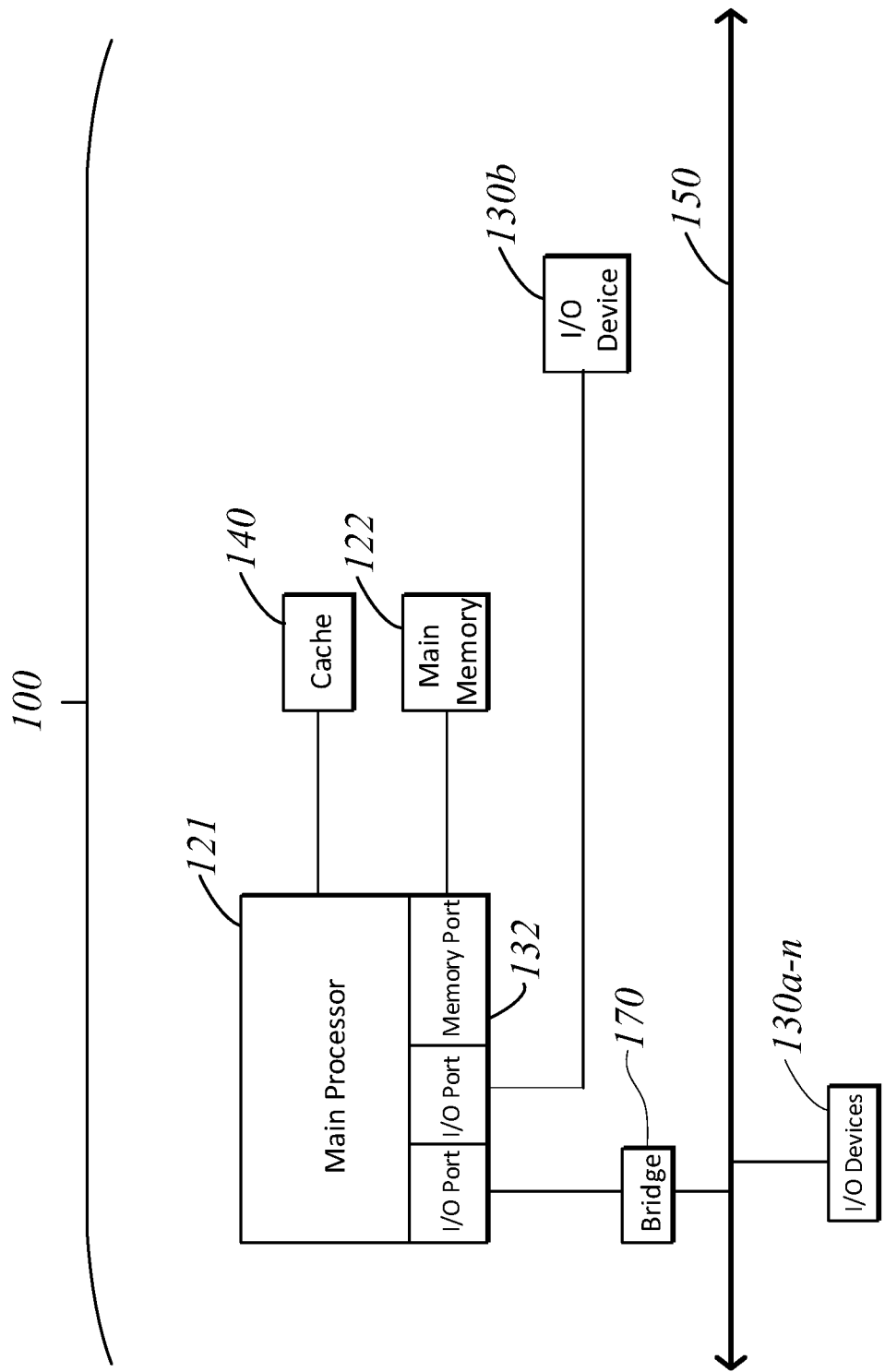

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g., a mouse. The storage device 128 may include, without limitation, an operating system, software, and collaborative editor 120, which can implement any of the features of the system 200 described herein below in conjunction with FIG. 2. As shown in FIG. 1D, each computing device 100 may also include additional optional elements, e.g., a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some implementations, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some implementations, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124a-124n may also be a head-mounted display (HMD). In some implementations, display devices 124a-124n or the corresponding I/O controllers 123 may be controlled through or have hardware support for OPENGL or DIRECTX API or other graphics libraries.

In some implementations, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some implementations, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the collaborative editor 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g., KNOPPIX, a bootable CD for GNU/Linux that is available as a GNU/Linux distribution from knoppix.net.

Client device 100 may also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include applications developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g., Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some implementations, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some implementations, the computing device 100 is a gaming system. For example, the computer system 100 may comprise a PLAYSTATION 3, a PLAYSTATION 4, PLAYSTATION 5, or PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, XBOX ONE X, XBOX SERIES S, or an XBOX SERIES X device manufactured by the Microsoft Corporation of Redmond, Washington.

In some implementations, the computing device 100 is a digital audio player such as the Apple IPOD, IPOD Touch, and IPOD NANO lines of devices, manufactured by Apple Computer of Cupertino, California Some digital audio players may have other functionality, including, e.g., a gaming system or any functionality made available by an application from a digital application distribution platform. For example, the IPOD Touch may access the Apple App Store. In some implementations, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some implementations, the computing device 100 is a tablet e.g., the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g., the KINDLE family of devices by Amazon.com, or the NOOK family of devices by Barnes & Noble, Inc. of New York City, New York In some implementations, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some implementations, a laptop or desktop computer is also equipped with a webcam or other video capture device that enables video chat and video call.

In some implementations, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Figure 2:
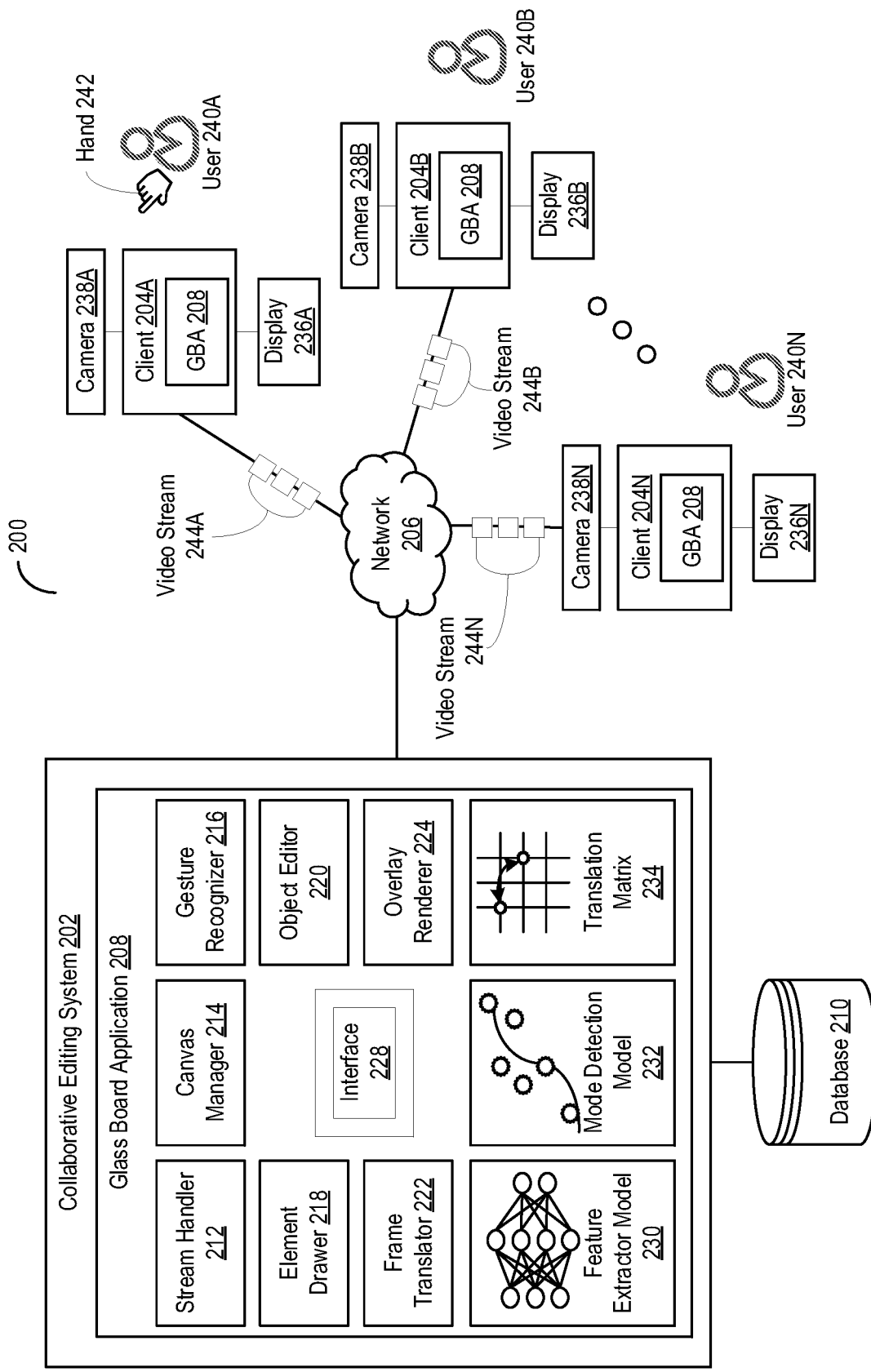
FIG. 2 depicts a block diagram of a system for providing multi-user collaborative interfaces in streaming video content in accordance with an illustrative embodiment.

B. Systems and Methods of Providing Multi-User Collaborative Interfaces for Video Streams Referring now to FIG. 2, depicted is a block diagram of a system 200 for providing multi-user collaborative interfaces in streaming video content. In overview, the system 200 can include at least one collaborative editing system 202 and a set of clients 204A-N (hereinafter generally referred to as clients 204), communicatively coupled with one another via a network 206. The collaborative editing system 202 can provide or include at least one glass board application 208 and at least one database 210, among others. The glass board application 208 can include at least one stream handler 212, at least one overlay manager 214, at least one gesture recognizer 216, at least one canvas drawer 218, at least one object editor 220, at least one frame translator 222, at least one interface renderer 224, at least one interface 228, at least one feature extractor model 230, at least one mode detection model 232, and at least one translation matrix 234, among others. Each client 204 can have an instance of the glass board application 208, at least one camera 238A-N (hereinafter generally referred to as a camera 238) and at least one display 236A-N (hereinafter generally referred to as a display 236). Each client 204 may be operated by or otherwise associated with at least one user 240A-N (hereinafter generally referred to as a user 240). At least one user 240 may have at least one hand 242 (e.g., left hand or right hand) in acquisition angle of the camera 238. Each of the components of system 200, including the collaborative editing system 202, each client 204, and the network 206, can be implemented or performed on hardware or a combination of hardware and software such as those detailed herein in conjunction with Section A.

The collaborative editing system 202 may include multiple, logically grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms.

The servers within each machine farm can be heterogeneous: one or more of the servers or machines can operate according to one or more types of operating system platform. The collaborative editing system 202 each can include servers in a data center that are stored in one or more high-density rack systems, along with associated storage systems, located for example in an enterprise data center. Each of the components of the collaborative editing system 202 can include at least one processing unit, server, virtual server, circuit, engine, agent, appliance, or other logic device such as programmable logic arrays configured to communicate and with other computing devices of the system 200. The database 210 can include one or more local or distributed databases and can include a database management system.

The database 210 can include, for example, training data used to train, establish, and maintain the feature extractor model 230 and the mode detection model 232. For example, the database 210 can include pictures of hands 242 to train the feature extractor model 230 to detect the overall hand 242, fingers on the hand 242, and other various characteristics. The database 210 can also include videos of hands 242 labeled as various operations to train the feature extractor model 230. Furthermore, the database 210 can include definitions of features to train the mode detection model 232 to recognize the draw command or an edit command as indicated by the hand 242. In some implementations, the database 210 can include parameters, weights, kernels, and other data for maintaining and applying the feature extractor model 230, the mode detection model 232, and the translation matrix 234, among others.

Each client 204 can include at least one logic device such as a computing device having one or more processors coupled with memory to communicate with other components of the system 200. The client devices 204 can include an instance of any of the components described in relation to the collaborative editing system 202. The client devices 204 can include a desktop computer, laptop, tablet computer, personal digital assistant, smartphone, mobile device, portable computer, thin client computer, virtual server, smart television, or other computing device. The client 204 can interface and be communicative coupled with the camera 238 and the display 236. The camera 238 of each client 204 can acquire a video stream 244A-N (hereinafter generally referred to as a video stream 244). The video stream 244 can include a sequence of image frames from an area or volume to which the camera 238 is pointed. For example, the video stream 244A can be of the user 240A and the hand 242 of the user moving in the area of view from the camera 238A. The client 204 can communicate the video stream 244 with other clients 204 via the network 206 for presentation on the displays 236 of the other clients 204.

The display 236 of each client 204 can provide visual information, such as information presented as a result of executing instructions stored in the memory of the client 204. The display 236 can include an liquid-crystal display (LCD) device, an organic light-emitting diode (OLED) display, a light-emitting diode (LED) display, a bi-stable display (e.g., e-ink, etc.), amongst others. The display 236 can present one or more user interfaces to various regions of the display in accordance with the implementations described herein. In some implementations, the display 236 can include interactive elements, such as a capacitive or resistive touch sensor. Thus, the display 236 can be an interactive display (e.g., a touchscreen, a display, etc.), and can include one or more input/output (I/O) devices or interfaces. The client 204 can further include or be in communication with (e.g., via a communications bus coupled to the processors of the client 204, etc.) one or more input devices, such as a mouse, a keyboard, or digital keypad, among others. The display 236 can be used to present one or more applications as described herein, such as web browsers or native applications. The display can include a border region (e.g., side border, top border, bottom border).

The network 206 can communicatively couple the components of the system 200, such as the collaborative editing system 202 and the clients 202. The network 206 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, an NFC (Near-Field Communication) network, a local area network (LAN), a wireless network or a wireline network, and combinations thereof. The network 206 can include a wireless link, such as an infrared channel or satellite band. The topology of the network 206 may include a bus, star, or ring network topology. The network 206 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols. In some implementations, the network 206 can facilitate or support a communication session (e.g., a video conference session) among a group of clients 204 and the collaborative editing system 202.

The collaborative editing system 202 can include and execute an instance of the glass board application 208. In brief, the stream handler 212 can facilitate communication and presentation of the video streams 244 acquired at the cameras 234 of the clients 204 via the interface 228. The canvas manager 214 can provide a canvas on which the user 240 can draw on or modify elements presented on the frames of the video streams 244. The gesture recognizer 216 can identify which command is indicated by the hand 242 of the user 240. The element drawer 218 can identify coordinates on which to draw visual elements on the frames of the video streams 244. The object editor 220 can perform modifications on visual elements presented on the frames of the video streams 244. The framer translator 222 can convert coordinates on the drawing canvas to the interface 228. The interface renderer 224 can display the interface 228 including the visual elements added by the element drawer 218 and modified by the object editor 220.

The collaborative editing system 202 can initiate, establish, and maintain the feature extractor model 230, the mode detection model 232, and the translation matrix 234 to facilitate in any of the operations performed by the other components in the glass board application 208. The feature extractor model 230 can include one or more machine learning algorithms or artificial intelligence models to extract gesture features in the image frames of the video stream 244. The feature extractor model 230 can be, for example, a deep neural network (DNN) (e.g., a convolutional neural network (CNN)), a classifier (e.g., a k-nearest neighbor), a clustering analysis (e.g., Gaussian mixture model) or a dimensionality reduction (e.g., independent component analysis), among others. The mode detection model 232 can include one or more machine learning algorithms or artificial intelligence models to select a command based on gesture features determined using the feature extractor model 230. The mode detection model 232 can be, for example, a regression model (e.g., linear or a logistic regression), a support vector machine (SVM), a decision tree, Naïve Bayes, a classifier (e.g., a k-nearest neighbor), a clustering analysis (e.g., Gaussian mixture model) or a dimensionality reduction (e.g., independent component analysis), among others. The translation matrix 234 can identify, specify, or define a transformation of coordinates from one plane defined by the orientation of the hand 242 of the user 240 to another plane defined by the display on the interface 228.

Each client 204 can also include and execute an instance of the glass board application 208. The functionalities of the collaborative editing system 202, such as the components of the glass board application 208, can be included or otherwise accessible from the client 204 (e.g., via the network 206). The functionalities of the collaborative editing system 202 may correspond to the functionalities or interface with the glass board application 208 executing on the clients 204. The clients 204 can each include and execute a separate instance of the one or more components of the glass board application 208. The clients 204 can otherwise have access to the functionalities of the components of the glass board application 208 on the collaborative editing system 202 via the network 206. The functionalities of the glass board application 208 and any of the components can be distributed between the collaborative editing system 202. For example, the client 204 can include a subset of the functionalities of the gesture recognizer 216 locally and can access the collaborative editing system 202 to access the remainder of the functionalities, such as invoking the mode detection model 232 and the feature extractor model 230, among others.

Referring to FIG. 3A, among others, depicted is a block diagram of a process 300 of presenting streaming content in the system 200 for providing multi-user collaborative interfaces. Under the process 300, the stream handler 212 can retrieve, identify, or otherwise a corresponding video stream 244 from each of the other clients 204. Each video stream 244 can be acquired via the camera 238 at the respective client 204. Upon receipt, the stream handler 212 can render, display, or present the video stream 244 via the interface 228 on the display 236. As depicted, the display 236 of the client 204 can render, display, or otherwise present the interface 228 of the glass board application 208. The interface 228 can be a set of windows 302A-D (hereinafter generally referred to windows 302). In some implementations, the stream handler 212 can identify the corresponding window 302 in the interface 228 for each video stream 244. With the identification, the stream handler 212 can display, present, or otherwise render the video stream 244 in the corresponding window 302 of the interface 228.

The windows 302 in the interface 228 can facilitate video communications among the users 238 of the clients 204. Each window 302 in the interface 228 can render, display, or present a corresponding video stream 244 from another client 204. Each video stream 244 can include a depiction of the user 240 and in some cases hands 240. The interface 228 can also indicate which video streams 244 are unavailable. For example, the first window 302A can correspond to the first video stream 244A from the first client 204A, the third window 302C can correspond to the third video stream 244C from the third client 204C, and the fourth window 302D can correspond to the fourth client 204D. The second window 302B, on the other hand, can present an indicator 304 that the video stream 244B from the second client 204B as unavailable (e.g., using an "X" sign over a video device as illustrated).

Figure 3B:
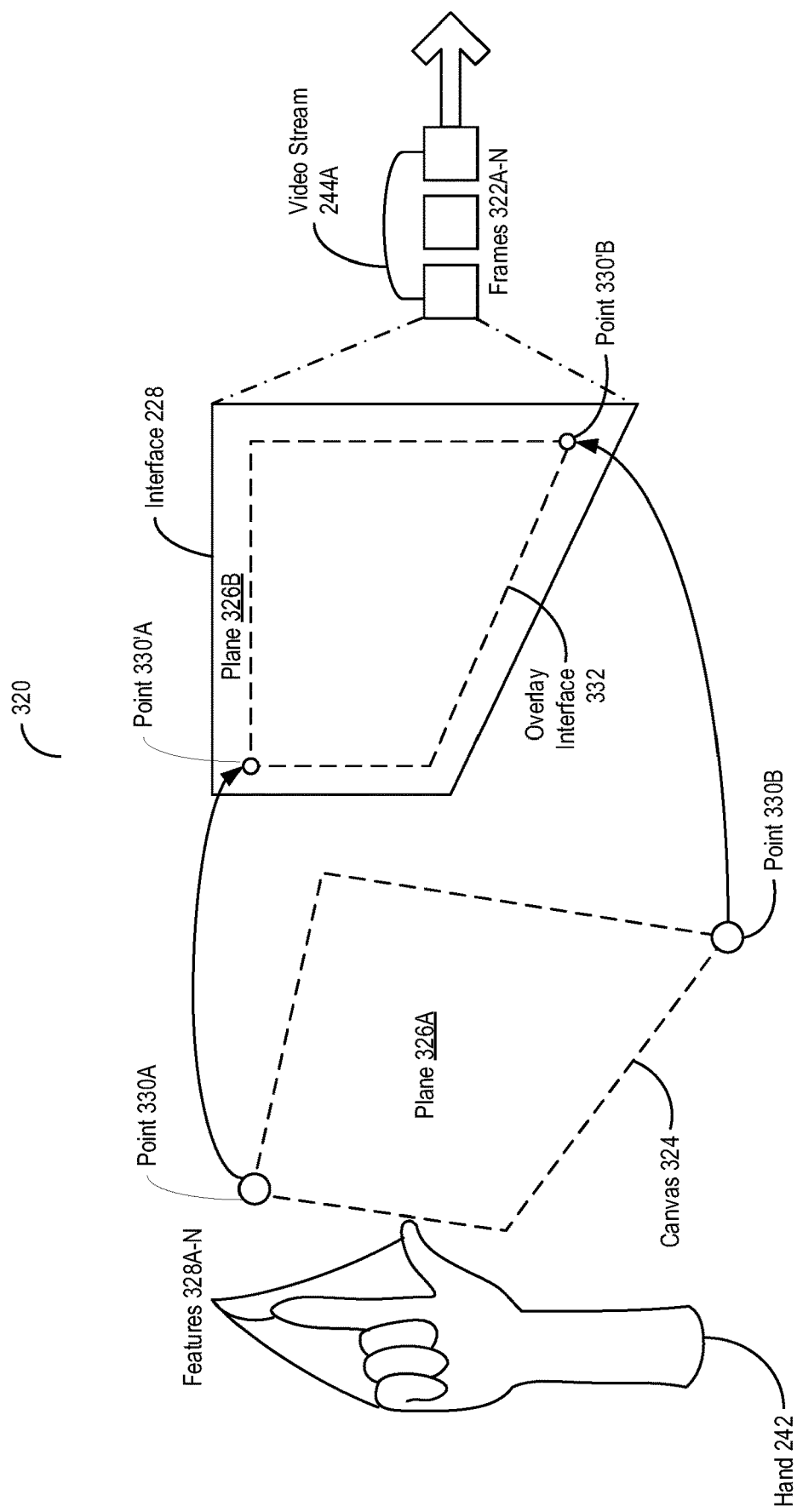
FIG. 3B depicts a block diagram of a process of defining a canvas in the system for providing multi-user collaborative interfaces in accordance with an illustrative embodiment.

Referring now to FIG. 3B, depicted is a block diagram of a process 320 of defining a canvas in the system 200 for providing multi-user collaborative interfaces. Under the process 320, the stream handler 212 can retrieve, identify, or otherwise receive the video stream 244 from the camera 238 of the client 204. The video stream 244 may have a sequence of frames 322A-N (hereinafter generally referred to as frames 322). Each frame 322 of the video stream 244 may correspond to an image acquired by the camera 238 at a sample time. The sampling rate between the sequence of frames 322 of the video frame 244 can range between 40 frames per second to 300 frames per second. The quality of the individual images in each frame 322 range between range between 144p to 8K. In some implementations, the stream handler 212 can send, provide, or otherwise transmit the video stream 244 from the camera 238 to other clients 204 in the network 206. For example, as the camera 238 acquires additional frames 322, the stream handler 212 can transmit the video stream 244 to the other clients 204 in the video conference session established over the network 206.

In conjunction, the canvas manager 214 of the glass board application 208 can identify or determine whether a canvas 324 (sometimes herein referred to as the virtual glass board) has been defined for the user 240. The canvas 324 can be defined as a plane 326A (sometimes referred herein as a drawing plane) on which the hand 242 is oriented. For example, the plane 326 can correspond to a space in which the user 240 moves the hand 242 to make gestures to be recognized as input into the interface 228 of the glass board application 208. The canvas 324 can be defined by one or more points 330A-N (hereinafter points 330) along the plane 326A. To determine, the canvas manager 214 can identify whether the canvas 324 was previously defined. The definition for the canvas 324 can be stored and maintained on the client 204 or on the database 210 accessible to the glass board application 208.

If the definition is found (e.g., in storage), the canvas manager 214 can determine that the canvas 324 is defined. The canvas manager 214 can also identify the canvas 324 to use for gesture recognition. On the other hand, if the definition is not found, the canvas manager 214 can determine that the canvas 324 is undefined. In some implementations, the canvas manager 214 can display or present a prompt on the interface 228 notifying the user 240 that the canvas 324 is undefined. The prompt may also provide a message to the user 240 to define the canvas 324. For example, the message presented by the canvas manager 214 can indicate "Using your hand, please form a rectangle in the air to form a canvas." The canvas manager 214 can also invoke the gesture recognizer 216 to detect the gestures from the hand 242 of the user to facilitate in creating the definition of the canvas 324.

The gesture recognizer 216 of the glass board application 208 can extract, identify, or otherwise determine a set of features 328A-N (hereinafter generally referred to features 328) associated with the hand 242. The features 328 can correspond to various gesture characteristics related to the hand 242, such as individual fingers (including thumb, index finger, middle finger, ring finger, and little finger), parts on the finger (e.g., the tip of a finger and phalanges), and action performed by the hand 242 (e.g., pointing, extending, folding, or clenching), among others. In determining, the gesture recognizer 216 can process or parse one or more of the frames 322 in the video stream 244. To parse, the gesture recognizer 216 can apply the feature extractor model 230 to the one or more frames 322. For example, the feature extractor model 230 may be a DNN with a set of kernels arranged in a convolutional layer, a rectified linear unit, and a down-sampler, among others. In applying, the gesture recognizer 216 can feed the image in each frame 322 into the feature extractor model 230 and process the image of the frame 322 in accordance with the set of kernels arranged in the feature extractor model 230. From processing, the gesture recognizer 216 can identify the features 328 associated with the hand 242 produced by the feature extractor model 230.

Based on the set of features 328 determined by the gesture recognizer 216, the canvas manager 214 can recognize, detect, or identify one or more points 330 for defining the plane 326A of the canvas 324. The points 330 can include or correspond to points on the plane 326A, and can be defined in terms of coordinates on the plane 326A. In some implementations, the points 330 can define corner points of boundaries for the canvas 324 (e.g., as depicted). Upon identification, the canvas manager 214 can store and maintain a definition for the plane 326A of the canvas 324 on the database 210 or locally at the client 204. The definition can identify or include the points 330 for the plane 326A of the canvas 324. With the definition of the canvas 324, the canvas manager 214 can invoke the frame translator 222 to define the translation matrix 234. In some implementations, the canvas manager 214 can invoke the overlay renderer 224 to present the canvas 324 on the interface 228.

Using the definition of the canvas 324, the frame translator 222 of the glass board application 208 can calculate, determine, or otherwise generate the translation matrix 234. The translation matrix 234 can identify, delineate, or specify a correspondence between points 330 along the plane 326 of the canvas 324 to points 330'A-N (hereinafter generally referred to as points 330') on a plane 326B of the interface 228 for an overlay interface 332 (sometimes herein referred to as an overlay frame). The points 330 defining the plane 326A for the canvas 324 can be defined relative to the points 330' on the plane 326B of the overlay interface 332. The points 330' can also be defined in terms of pixel coordinates in the interface 228 or the overlay interface 332. The plane 326B may correspond to or reside on the same surface (e.g., along the display 236), and may be common to both the overall interface 228 and the overlay interface 332. The plane 326A for the canvas 324 can be oblique to the plane 326B of the overlay interface 332.

For each point 330 of the plane 326A, the frame translator 222 can determine or identify a corresponding point 330' on the plane 326B. The identification of the correspondence between the points 330 on the plane 326A and the points 330' on the plane 326B can be based on boundaries of the canvas 324 and boundaries of the overlay interface 332. The boundaries of the overlay interface 332 within the overall interface 228 can be predetermined or fixed (e.g., using the settings or configurations of the glass board application 208). With the identification of the correspondence between the points 330 and 330', the frame translator 222 can generate the translation matrix 234. Upon generation, the frame translator 222 can store and maintain the translation matrix 234 on the database 210 or locally at the client 204.

In addition, the overlay renderer 224 of the glass board application 208 can provide, present, or otherwise render the canvas 324 within the interface 228 as the overlay interface 332. The presentation of the overlay interface 332 can be subsequent or in response to the definition of the canvas 324 using the canvas manager 214. To render, the overlay renderer 224 can include or insert the boundaries of the overlay interface 332 on the overall interface 228. For example, the overlay renderer 224 can insert a transparent graphical user interface (GUI) element over the rendering of the frames 322 of the video stream 244 into the interface 228. The overlay render 224 can also insert or include the overlay interface 228 into the frames 322 of the video stream 224 to provide to other clients 204 for presentation.

Figure 3C:
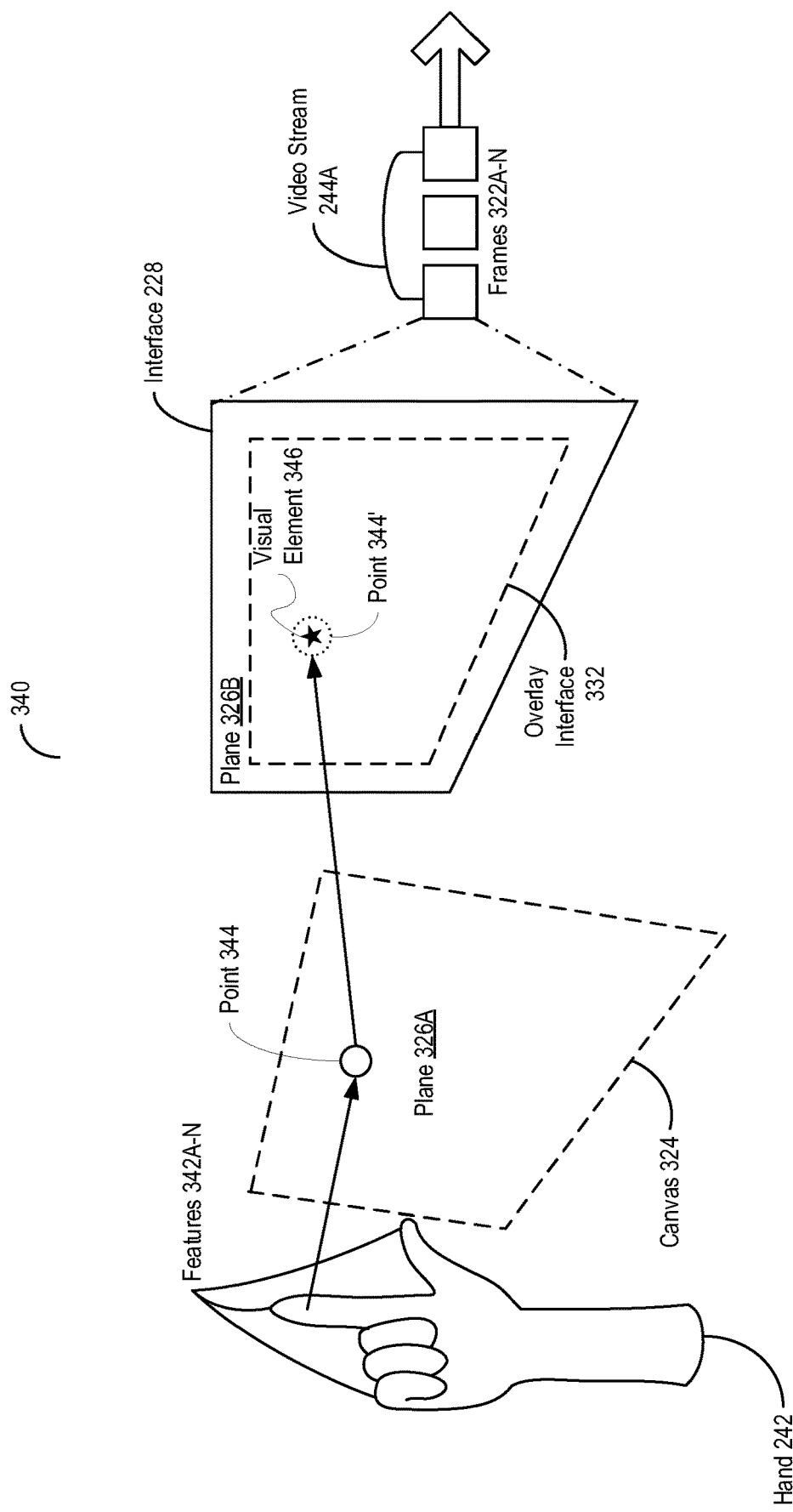
FIG. 3C depicts a block diagram of a process for a draw command in the system for providing multi-user collaborative interfaces in accordance with an illustrative embodiment.

Referring now to FIG. 3C, depicted is a block diagram of a process 340 for a draw command in the system 200 for providing multi-user collaborative interfaces. Under the process 340, the gesture recognizer 216 can determine a set of features 342A-N (hereinafter generally referred to as features 342) associated with the hand 242 of the user 240. The set of features 342 can be within the canvas 324 defined on the plane 328A. The determination of the features 342 can be similar as described as the determination of the features 328 as described above. For example, the gesture recognizer 216 can apply the feature extraction model 230 to the images in the frames 322 of the video stream 244 to determine the features 342. In some implementations, the gesture recognizer 216 can determine the set of features 342 from within the canvas 324 on the plane 328A. To determine, the gesture recognizer 216 can identify a portion of the image in the frame 322 of the video stream 244 corresponding to the overlay interface 332. The portion of the frame 322 corresponding to the overlay interface 232 by extension may correspond to the canvas 324. The gesture recognizer 216 can apply the feature extraction model 230 to the image in the identified portion of the frame 322 to determine the features 342.

Based on the features 342, the gesture recognizer 216 can determine whether the hand 242 indicates or corresponds to a draw command (sometimes herein referred to as a draw mode) or an edit command (sometimes herein referred to as a gesture mode). Certain sets of features 342 can correspond to the draw command, while other sets of features 342 can correspond to the edit command. Similar to the features 328 as discussed above, the features 342 can correspond to various gesture characteristics related to the hand 242, such as individual fingers, parts on the finger, and action performed by the hand 242, among others. For example, when the features 342 correlate with the hand 242 in a pointed posture (e.g., as depicted), the gesture recognizer 216 can determine that the hand 242 corresponds to the draw command. Based on the correlation of features 342 to the edit command or the draw command, the gesture recognizer 216 can determine which command the hand 242 is indicating.

In some implementations, the gesture recognizer 216 can apply the mode detection model 232 to the features 342 to determine whether the hand 242 indicates the draw command or the edit command. For example, the mode detection model 232 can be a logistic regression model defining a feature space for the set of features 342. The feature space in the logistic regression model can delineate a region corresponding to the draw command (e.g., above the regression plane) and another region corresponding to the edit command (e.g., below the plane). For the set of features 342, the gesture recognizer 216 can identify a point in the feature space defined by the mode detection model 232. From the identification, the gesture recognizer 216 can determine whether the point resides in the region corresponding to the draw command or the region corresponding to the edit command. When the point is within the region corresponding to the edit command, the gesture recognizer 216 can determine that the hand 242 corresponds to the edit command rather than the draw command. Conversely when the point is within the region corresponding to the draw command, the gesture recognizer 216 can determine that the hand 242 corresponds to the draw command instead of the edit command. In response to this determination, the gesture recognizer 216 can invoke the element drawer 218.

When the hand 242 indicates the draw command, the element drawer 218 of the glass board application 208 can identify at least one point 344 to which to apply the draw command based on the set of features 342. At least one of the features 342 may correspond to a top phalange or a tip of an index finger (e.g., as shown) of the hand 242. From the set of features 342, the element drawer 218 can select or identify at least one feature 342 corresponding to the point 344 on the plane 326A. The point 344 can be defined in terms of coordinates on the plane 326A of the canvas 324. The coordinates on the plane 326A can be defined relative to the boundaries of the canvas 324 (e.g., top-left corner of the boundary).

Upon identification, the element drawer 218 can invoke the frame translator 222 to determine a point 344' on the plane 326B of the overlay interface 332 to which to apply the draw command. The frame translator 222 can apply the translation matrix 234 to the point 344 on the plane 326A to calculate, determine, or identify the point 344' on the plane 326B of the overlay interface 332. In some implementations, the frame translator 222 can access the database 210 or local storage on the client 204 to identify or retrieve the translation matrix 234. The translation matrix 234 can define a mapping, correspondence, or translation of coordinates in the plane 326A of the canvas 324 to pixel coordinates in the plane 326B of the overlay interface 332. In applying, the frame translator 222 can input the coordinates of the point 344 into the translation matrix 234 to produce or output coordinates for the point 344'.

Using the point 344', the element drawer 218 can invoke the overlay renderer 244 to display, present, or otherwise render a visual element 346 at the point 344' in the overlay interface 332. The visual element 346 can be a graphical indicator of the draw command, such as a brush, a mark, a spray, or other shapes (e.g., a star as depicted), among others. The visual element 346 can have any one or more graphic attributes (e.g., specified by the user 240), such as color, size, thickness, or opaqueness, among others. In some implementations, the element drawer 218 can render the visual element 346 around or about the coordinates corresponding to point 344' within the overlay interface 332 of the interface 228. The element drawer 218 can store and maintain the visual element 346 and related information (e.g., boundaries and coordinates) for rendering on the database 210 or locally at the client 204.

In addition, the overlay renderer 244 can insert or include the visual element 346 at the point 344' in the frames 322 of the video stream 244 to provide for presentation to other clients 204. In some implementations, the overlay renderer 244 can provide, send, or transmit rendering information for the visual element 364 separately from the frames 322 of the video stream 244. The rendering information can include the graphical characteristics of the visual element 364, such as coordinates within the overlay interface 322, dimensions, and color values for pixels of the image. The overlay render 244 at the recipient client 204 can render the visual element 346 over the images of the frames 322 in the video stream 244.

Figure 3D:
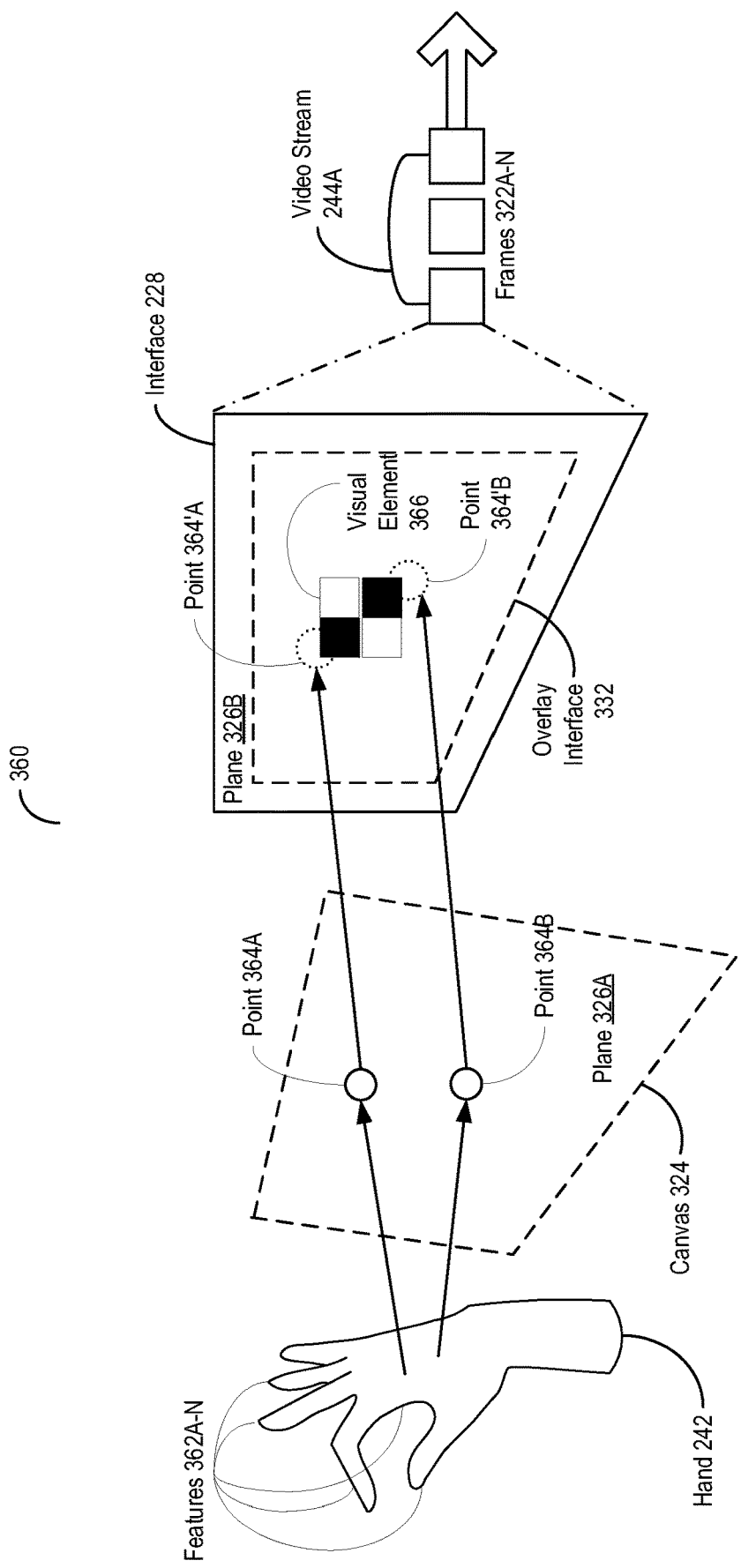
FIG. 3D depicts a block diagram of a process for an edit command in the system for providing multi-user collaborative interfaces in accordance with an illustrative embodiment.

Referring now to FIG. 3D, depicted is a block diagram of a process 360 for an edit command in the system 200 for providing multi-user collaborative interfaces. Under the process 360, the gesture recognizer 216 can determine a set of features 362A-N (hereinafter generally referred to as features 362) associated with the hand 242 of the user 240. The set of features 362 can be within the canvas 324 defined on the plane 328A or by extension the portion of the one or more frames 322 in the video stream 322 corresponding to the overlay interface 332. The determination of the features 362 can be similar as described as the determination of the features 328 and 342 as described above. For example, the gesture recognizer 216 can determine the set of features 362 from within the canvas 324 on the plane 328A. The gesture recognizer 216 can then apply the mode detection model 232 to the features 362 to determine that the hand 242 indicates the edit command as opposed to the draw command. Furthermore, the gesture recognizer 216 can invoke the object editor 220 to carry out the edit command. In general, the edit command can correspond to an operation to modify an existing visual element 366 rendered on the overlay interface 332.

With the determination that the hand 242 corresponds to the edit command, the gesture recognizer 216 can select or identify an operation to apply based on the set of features 362. The features 362 used to identify the operation can be extracted from multiple frames 322 in the video stream 244. The operation can include a move operation, an undo operation, a redo operation, and a scaling operation, among others. Certain features 362 extracted from the frames 322 can correspond to or can be correlated with the varying operations of the edit command. For example, a set of features 362 indicating a clenching or a stretching of fingers (e.g., as depicted) of the hand 242 can indicate the scaling operation. Furthermore, a set of features 362 correlated with a movement of the overall hand 242 from one portion to another portion of the canvas 324 can indicate a move operation. In some implementations, the gesture recognizer 216 can use the feature extraction model 230 on the images taken from the frames 322 of the video stream 244 to further produce the set of features 362 and to identify the operation.

When the hand 242 indicates the edit command, the object editor 220 of the glass board application 208 can identify one or more points 364A and 364B (hereinafter generally referred to as 364) based on the features 362. In some implementations, the object editor 220 can identify the points 364 further based on the operation indicated by the hand 242. The points 364 can correspond to regions of interest on the plane 326A of the canvas 324 for carrying out the operation for the edit command. The set of features 362 can correspond to various relevant points on the hand 242 for performing the operation of the edit command. For instance, in the depicted example, the hand 242 may be determined to be indicating a scaling operation for the edit command. The object editor 220 can identify the first point 364A and the second point 364B as relevant to the scaling operation. The points 364 can be defined in terms of coordinates on the plane 326A in the canvas 324. The coordinates of the points 364 can be defined relative to the boundaries of the canvas 324.

With the identification, the object editor 220 can invoke the frame translator 222 to identify or determine corresponding points 364' on the plane 326B of the overlay interface 332 to which to apply the edit command. The determination of the points 364' using the frame translator 222 may be similar to the determination of the point 344' as described above. For instance, the frame translator 222 can apply the translation matrix 234 to the coordinates of the points 364 on the plane 326A to determine the coordinates of the points 364' on the plane 326B of the overlay interface 332. In addition, the object editor 220 can invoke the frame translator 222 to determine coordinates associated with the visual element 366 rendered on the overlay interface 332. The coordinates for the visual element 366 can correspond to boundaries (e.g., top-left and bottom-right corners).

Upon identifying, the object editor 220 can determine whether the coordinates of the points 364' associated with the edit command correspond to the coordinates of the visual element 366. In determining, the object editor 220 can compare the coordinates of the points 364' to the coordinates of the visual element 366 to calculate or determine a distance. The object editor 220 can then compare the distance between the coordinates against a threshold. The threshold may define or delineate a value for the distance at which the edit command indicated by the hand 242 is to be applied to the visual element 366. If the distance does not satisfy (e.g., is greater than) the threshold, the object editor 220 can determine that the coordinates of the points 364' associated with the edit command correspond to the coordinates of the visual element 366. The object editor 220 can also refrain from performing further action to the visual element 366.

Conversely, if the distance does not satisfy (e.g., is greater than) the threshold, the object editor 220 can determine that the coordinates of the points 364' associated with the edit command correspond to the coordinates of the visual element 366. In response to this determination, the object editor 220 can apply the operation determined from the set of features 362 associated with the hand 242 to the visual element 366. To apply in accordance with the operation of the edit command, the object editor 220 can modify the visual element 366 based on the one or more points 364. For example, when the hand 242 of the user 240 indicates a scaling operation, the object editor 220 can change the dimensions of the visual element 366 based on the points 364'A and 364'B. When the hand 242 indicates a move operation, the object editor 220 can move the visual element 366 from one point 364A to another point 364B. When the hand 242 indicates an undo operation, the object editor 220 can restore the visual element 366 to a prior state. The object editor 220 can store and maintain the newly modified visual element 366 on the database 210 or locally on the client 204. With the modification, the object editor 220 can invoke the overlay renderer 224 can invoke the overlay renderer 244 to display, present, or otherwise render the modified visual element 366. The rendering of the modified visual element 366 can replace the previous rendering of the visual element 366. Furthermore, the overlay renderer 244 can insert or include the modified visual element 366 in the frames 322 of the video stream 244 to provide for presentation to other clients 204. In some implementations, the overlay renderer 244 can provide, send, or transmit rendering information for the visual element 366 separately from the frames 322 of the video stream 244 in a similar manner as discussed above.

Referring now to FIG. 3E, depicted is a block diagram of a process 380 of mirroring renderings in the system 200 for providing multi-user collaborative interfaces. Under the process 380, the overlay renderer 224 can present, display, or otherwise render a mirroring of the visual element 382 within the overlay interface 332 of the interface 228 at the drawer side. The drawer side can correspond to the user 240 to which the hand 242 used to perform the draw command or the edit command belongs to (e.g., corresponding to the display 236A). As seen in the example, the interface 228 on the drawer side can include a depiction of the viewer (e.g., another user 240) acquired in the frames 322 of the video stream 244B received by the client 204. The mirroring may be across a longitudinal (or vertical) axis of the interface 228 or by extension the overlay interface 322. When inserting into the frames 322 of the video stream 244 to provide to another client 204 (e.g., with display 236B), the overlay renderer 224 can insert or include a non-mirrored (or reversed) version of rendering of the visual element 382 In some implementations, the overlay renderer 244 can provide, send, or transmit rendering information for the visual element 382 separately from the frames 322 of the video stream 244 in a similar manner as discussed above. The rendering information can also specify an indication of whether to mirror the visual element 382.

At the viewer side, the stream handler 212 can retrieve, identify, or otherwise receive the video stream 244 from the client 204 of the drawer side. While receiving, the stream handler 212 can present, display, or render the frames 322 of the video stream 244 on the interface 228. As illustrated, the interface 228 on the viewer side can include a depiction of the hand from the drawer side as well as a visual element 382'. The visual element 382' can correspond to a non-mirrored (or reversed) version of the visual element 382 of the drawer side. In the depicted example, the checkered box of the visual element 382 may be transposed about the longitudinal axis in relation to the checkered box of the visual element 382'. The processes 320-360 can also be repeated in reverse from the viewer side to add or modify the visual element 382'. In this fashion, the additions and modifications made from the interface 228 on the display 236B can be provided for rendering on the interface 228 in the display 236A.

In some implementations, the overlay renderer 224 can apply a perspective correction to the rendering of the frames 322 of the video stream 244 at both the drawer side and the viewer side. The perspective correction can account for a position or an orientation of the user 240 relative to the display 236 (or by extension the interface 228) for rendering the video stream 224. The overlay renderer 224 can calculate, determine, or identify the position and the orientation of the user 240 from the images in each frame 322 of the video stream 244. In some implementations, the overlay renderer 224 can invoke the gesture recognizer 216 to detect the position and orientation of the user 240 from the frames 244 using the feature extractor model 230. Based on the position and orientation of the user 240, the overlay render 224 can adjust, modify, or otherwise set (e.g., skew) the rendering of the frames 322 in the video stream 244 on the interface 228 of the display 236.

In this manner, the glass board application 208 executing on the collaborative editing system 202 and the clients 204 in the network 206 can provide an environment in which multiple users 240 can draw and modify visual elements displayed through the interface 228. As the users 240 no longer have to open separate applications to perform collaborative editing, the glass board application 208 can drastically improve the quality of human-computer interactions (HCI) between the users 240 and their respective clients 204. Moreover, the glass board application 208 can also save computing resources and network bandwidth that would have been consumed from opening such separate applications.

Figure 4:
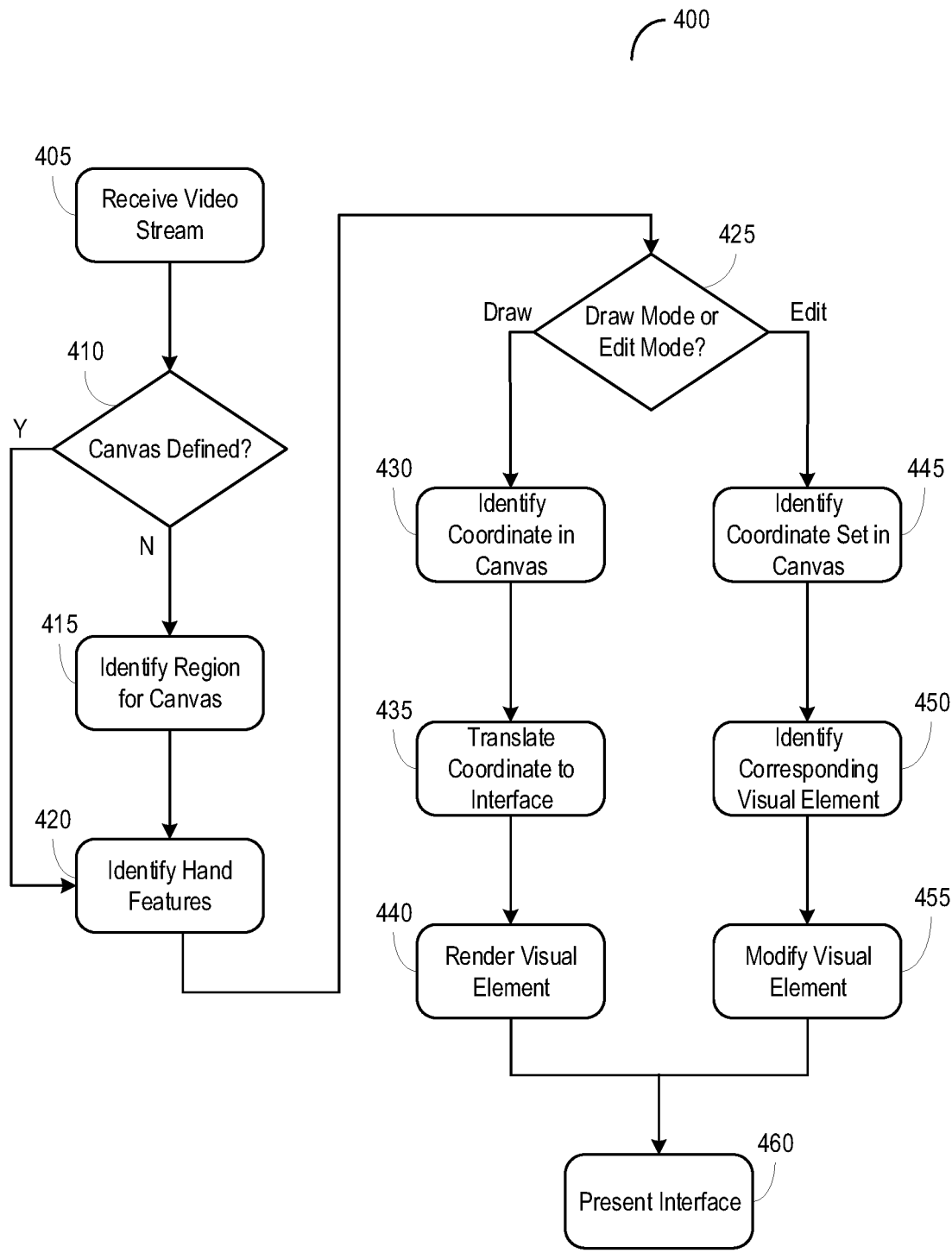
FIG. 4 depicts a flow diagram of a method of providing multi-user collaborative interfaces in streaming video content in accordance with an illustrative embodiment.

Referring now to FIG. 4, depicted is a flow diagram of a method 400 of providing multi-user collaborative interfaces in streaming video content. The method 400 can be implemented using or performed by components detailed herein in conjunction with FIGS. 1-3E. In overview, a computing system can receive a video stream (405). The computing system can determine whether a canvas is defined (410). If the canvas is not defined, the computing system can identify a region for the canvas (415). The computing system can identify hand features (420). The computing system can determine whether to enter draw mode or edit mode (425). When in draw mode, the computing system can identify a coordinate in the canvas (430). The computing system can translate the coordinate to an interface (435). The computing system can render a visual element (440). When in edit mode, the computing system can identify a set of coordinates in the canvas (445). The computing system can identify a corresponding visual element (450). The computing system can modify the visual element (455). The computing system can present the interface (460).

In further detail, a computing system (e.g., the collaborative editing system 202 or the client 204) can receive a video stream (e.g., the video stream 244) (405). The video stream can include a sequence of frames acquired via a camera (e.g., the camera 238). The frames can include a depiction of a user and the user's hand. The video stream may have been communicated by other clients in the network.

The computing system can determine whether a canvas (e.g., the canvas 324) is defined (410). The canvas can correspond to a plane on which the user's hand is oriented or along which the user's hand moves. To determine, the computing system can access a storage (e.g., the database 210) to find a definition for the canvas. When there is no definition, the computing system can determine that the canvas is not defined.

If the canvas is not defined, the computing system can identify a region (e.g., the plane 326A) for the canvas (415). The computing device can determine gesture features from the user's hand. The computing system can use the features to identify points along the plane to define the boundaries of the canvas. The computing system can also map the plane of the region to a plane of a display interface via a translation matrix.

In any event, the computing system can identify hand features (e.g., features 342 or 362) (420). The hand features can be determined from the canvas region. To determine, the computing system can apply a feature extraction model (e.g., a deep neural network (DNN)) to images in frames of the video stream of the user's hand. The hand features can correspond to individual fingers, parts of the fingers and the hand, and actions performed by the hand, among others.

The computing system can determine whether to enter draw mode or edit mode (425). In determining, the computing system can apply a mode selection model (e.g., a logistic regression model) to the hand features. The mode selection model can define a feature space, with one region corresponding to the draw mode and another region corresponding to the edit mode. When the features are within the region for the draw mode, the computing system can enter the draw mode. Otherwise, when the features are within the region for the edit mode, the computing system can enter the edit mode.

When in draw mode, the computing system can identify a coordinate in the canvas (430). The coordinate can correspond to a point on the canvas to which to add a visual element in accordance with the draw mode. The computing system can identify the coordinate based on the hand features extracted from the frames of the video stream. The computing system can translate the coordinate to an interface (e.g., the interface 228) (435). The computing system can use the translation matrix to map the coordinates of the point in the canvas to the coordinates along the display interface. The computing system can render a visual element (440). Upon identification, the computing system can add the visual element at the coordinates in the display interface. a When in edit mode, the computing system can identify a set of coordinates in the canvas (445). The set of coordinates can correspond to points in the canvas relevant to the performance of the edit mode. The edit mode can include one or more operations, such as a move operation, a scaling operation, an undo operation, and a redo operation, among others. The computing system can apply the feature extraction model to further determine which operation to perform.

The computing system can identify a corresponding visual element (450). With the identification of the coordinates, the computing system can identify the visual element to which the operation is to be applied. The computing system can use the translation matrix to the coordinates of the set of points in the canvas to identify the corresponding coordinates on the display interface. Based on a comparison, the computing system can identify the visual element to be modified. The computing system can modify the visual element (455). Once identified, the computing system can modify the visual element in accordance with the operation.

The computing system can present the interface (460). The computing system can render the visual element on the interface by inserting the visual element into the frames of the video stream. At the viewer side, the computing system can render a non-mirrored rendering of the visual element on the interface, along with the rest of the image in the frames of the received video stream. On the drawer side, the computing system can render a mirrored rendering of the visual element on the display interface.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the educational content system 205 can include clients and servers. For example, the educational content system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the educational content system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for multi-user collaborative interfaces in streaming video content, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method of providing multi-user collaborative interfaces, comprising:

receiving, by a computing system via a camera, a video stream having a plurality of frames of a user's hand, the video stream having an overlay interface defined along a first plane;

identifying, by the computing system, in at least one of the plurality of frames, a region defined on a second plane on which the user's hand is oriented;

determining, by the computing system, that a set of features associated with the user's hand within the region defined on the second plane corresponds to a draw mode;

identifying, by the computing system, from the region defined on the second plane, a first coordinate for the draw mode based on at least one of the set of features;

translating, by the computing system, the first coordinate defined on the second plane to a second coordinate defined on the first plane of the overlay interface to which to apply the draw mode;

rendering, by the computing system, a visual element at the second coordinate in the overlay interface of the video stream;

displaying, by the computing system via a display, the video stream and the rendered visual element in the overlay interface; and providing, by the computing system via a network to a second computing system, the video stream and a reversed rendering of the visual element;

determining, by the computing system, that a second set of features associated with the user's hand within the region corresponds to an edit mode;

identifying, by the computing system, from the region defined on the second plane, a third coordinate for the edit mode based on at least one of the second set of features;

determining, by the computing system, that the third coordinate defined on the second plane corresponds to the visual element at the second coordinate defined on the second coordinate; and modifying, by the computing system responsive to determining that the third coordinate corresponds to the visual element, the rendering of the visual element in accordance with the edit mode.

2. The method of claim 1, wherein determining that the second set of features corresponds to the edit mode further comprises:
applying a feature extraction model to the region in at least one of the plurality of frames to detect the second set of features; and
identifying the edit mode from a plurality of edit modes based on the second set of features, the plurality of edit modes including a move operation, an undo operation, a redo operation, and a scaling operation.

3. The method of claim 1, further comprising translating, by the computing system, a fourth coordinate for the edit mode defined on the second plane to a fifth coordinate on the first plane of the overlay interface; and
wherein modifying the rendering further comprises modifying the rendering of the visual element based on the second coordinate and the fifth coordinate in accordance with the edit mode.

4. The method of claim 1, further comprising:
determining, by the computing system responsive to the region not being defined, a second set of features associated with the user's hand in at least one of the plurality of frames of the video stream; and
identifying, by the computing system, based on the second set of features, a plurality of coordinates on the second plane to define the region, the second plane oblique to the first plane.

5. The method of claim 1, further comprising applying, by the computing system, a perspective correction to each frame in the plurality of frames in accordance with a position of a user relative to a display for rendering of the video stream.

6. The method of claim 1, wherein translating the first coordinate further comprises applying a matrix transformation to the first coordinate from the second plane to identify the second coordinate in the first plane of the overlay interface, the matrix transform defining a translation from the second plane of the region to first plane of the overlay interface.

7. A method of providing multi-user collaborative interfaces, comprising:
receiving, by a computing system via a camera, a video stream having a plurality of frames of a user's hand, the video stream having an overlay interface defined along a first plane;
identifying, by the computing system, in at least one of the plurality of frames, a region defined on a second plane on which the user's hand is oriented;
determining, by the computing system, that a set of features associated with the user's hand within the region defined on the second plane corresponds to a draw mode by applying a mode identification model to the set of features from the region of at least one of the plurality of frames to select the draw mode instead of an edit mode;
identifying, by the computing system, from the region defined on the second plane, a first coordinate for the draw mode based on at least one of the set of features;
translating, by the computing system, the first coordinate defined on the second plane to a second coordinate defined on the first plane of the overlay interface to which to apply the draw mode;
rendering, by the computing system, a visual element at the second coordinate in the overlay interface of the video stream;
displaying, by the computing system via a display, the video stream and the rendered visual element in the overlay interface; and
providing, by the computing system via a network to a second computing system, the video stream and a reversed rendering of the visual element.

8. A system for providing multi-user collaborative interfaces, comprising:
a computing system having one or more processors coupled with memory, configured to:
receive, via a camera, a video stream having a plurality of frames of a user's hand, the video stream having an overlay interface defined along a first plane;
identify, in at least one of the plurality of frames, a region defined on a second plane on which the user's hand is oriented;
determine that a set of features associated with the user's hand within the region defined on the second plane indicates a draw mode;
identify, from the region defined on the second plane, a first coordinate for the draw mode based on at least one of the set of features;
translate the first coordinate defined on the second plane to a second coordinate defined on the first plane of the overlay interface to which to apply the draw mode by applying a matrix transformation to the first coordinate from the second plane to identify the second coordinate in the first plane of the overlay interface, the matrix transform defining a translation from the second plane of the region to first plane of the overlay interface;
render a visual element at the second coordinate in the overlay interface of the video stream;
display, via a display, the video stream and the rendered visual element in the overlay interface; and
provide, via a network to a second computing system, the video stream and a reversed rendering of the visual element.

9. The system of claim 8, wherein the computing system is further configured to
determine that a second set of features associated with the user's hand within the region corresponds to an edit mode;
identify, from the region defined on the second plane, a third coordinate for the edit mode based on at least one of the second set of features;
determine that the third coordinate defined on the second plane corresponds to the visual element at the second coordinate defined on the second coordinate; and
modify, responsive to determining that the third coordinate corresponds to the visual element, the rendering of the visual element in accordance with the edit mode.

10. The system of claim 9, wherein the computing system is further configured to determine that the second set of features corresponds to the edit mode by:
applying a feature extraction model to the region in at least one of the plurality of frames to detect the second set of features; and
identifying the edit mode from a plurality of edit modes based on the second set of features, the plurality of edit modes including a move operation, an undo operation, a redo operation, and a scaling operation.

11. The system of claim 8, wherein the computing system is further configured to:

translate a fourth coordinate for the edit mode defined on the second plane to a fifth coordinate on the first plane of the overlay interface; and modify the rendering of the visual element based on the second coordinate and the fifth coordinate in accordance with the edit mode.

12. The system of claim 8, wherein the computing system is further configured to:

determine, responsive to the region not being defined, a second set of features associated with the user's hand in at least one of the plurality of frames of the video stream; and identify, based on the second set of features, a plurality of coordinates on the second plane to define the region, the second plane oblique to the first plane.

13. The system of claim 8, wherein the computing system is further configured to apply a perspective correction to each frame in the plurality of frames in accordance with a position of a user relative to a display for rendering of the video stream.

14. The system of claim 8, wherein the computing system is further configured to apply a mode identification model to the set of features from the region of at least one of the plurality of frames to select the draw mode instead of an edit mode.

* * * * *